(12) United States Patent
Preisler et al.

(10) Patent No.: US 6,672,611 B2
(45) Date of Patent: *Jan. 6, 2004

(54) AIR BAG DEPLOYMENT CHUTE AND PANEL ASSEMBLY

(75) Inventors: Darius J. Preisler, Macomb, MI (US); Jason T. Murar, Clinton Township, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/153,059

(22) Filed: May 21, 2002

(65) Prior Publication Data

US 2002/0195801 A1 Dec. 26, 2002

Related U.S. Application Data

(63) Continuation-in-part of application No. 09/885,710, filed on Jun. 20, 2001, now Pat. No. 6,467,801.

(51) Int. Cl.⁷ .............................................. B60R 21/16
(52) U.S. Cl. .................................. 280/728.3; 280/732
(58) Field of Search ........................... 280/728.2, 728.3, 280/732, 731

(56) References Cited

U.S. PATENT DOCUMENTS

| 5,421,608 A | 6/1995 | Parker et al. | |
| 5,569,959 A | 10/1996 | Cooper et al. | |
| 5,698,283 A | 12/1997 | Yamasaki et al. | |
| 5,738,367 A | * 4/1998 | Zichichi et al. | 280/728.3 |
| 5,779,262 A | 7/1998 | Totani et al. | |
| 5,863,062 A | * 1/1999 | Harada et al. | 280/728.3 |
| 5,868,419 A | * 2/1999 | Taguchi et al. | 280/728.3 |
| 5,927,747 A | 7/1999 | Farrington | |
| 6,076,851 A | 6/2000 | Davis, Jr. et al. | |
| 6,089,642 A | 7/2000 | Davis, Jr. et al. | |
| 6,318,752 B1 | 11/2001 | Warnecke et al. | |
| 6,341,796 B1 | 1/2002 | Preisler | |
| 6,467,800 B1 | * 10/2002 | Bey et al. | 280/728.3 |
| 2001/0045728 A1 | * 11/2001 | Kansteiner et al. | 280/728.3 |
| 2002/0003343 A1 | * 1/2002 | Kansteiner | 280/728.3 |
| 2003/0067145 A1 | * 4/2003 | Yasuda et al. | 280/728.3 |

FOREIGN PATENT DOCUMENTS

| JP | 09286293 A | * 11/1997 |
| JP | 10024792 A | * 1/1998 |

* cited by examiner

Primary Examiner—Paul N. Dickson
Assistant Examiner—Ruth Ilan
(74) Attorney, Agent, or Firm—Brooks Kushman P.C.

(57) ABSTRACT

The present invention involves an air bag deployment chute and panel assembly for deploying an air bag through a panel member having a groove. The deployment chute comprises a stationary portion and one or more door portions depending on the shape of the prescribed tear pattern (i.e., "I", "H" or "U"). The stationary portion includes a base and a peripheral wall integrally connected thereto. The base has a first surface attached to an inner surface of the panel member and an opening to define an inner periphery of the base. The inner periphery is positioned against a structurally weakened area of the panel member defined by the groove so that outer portions of the groove are supported by the base to prevent inadvertent pivotal movement of the one or more door portions toward the air bag when force is applied on the outer surface of the panel member.

21 Claims, 4 Drawing Sheets

AIR BAG DEPLOYMENT CHUTE AND PANEL ASSEMBLY

CROSS-REFERENCE TO RELATED APPLICATIONS

This application is a continuation-in-part of U.S. application Ser. No. 09/885,710 filed Jun. 20, 2001, now issued as U.S. Pat. No. 6,467,801.

BACKGROUND OF THE INVENTION

1. Field of the Invention

The present invention is related to an air bag deployment chute and panel assembly for deploying an air bag through a panel member of a vehicle to dissipate impact energy on the panel member during impact of the vehicle.

2. Background Art

Improvements continue to be made on vehicle air bag deployment systems for vehicle impact situations. Many current air bag deployment systems are configured to deploy an air bag through a panel member of a vehicle during impact of the vehicle. Many such deployment systems are disposed on a front panel member of a vehicle to dissipate impact energy on the front panel member during impact of the vehicle. Typically, the front panel member to which such deployment system is attached includes a visible tear seam outlining an area through which an air bag deploys upon impact of the vehicle. In many situations, the front panel member has an opening formed therein to define the tear seam and thus the area through which the air bag may be deployed. The panel member further includes a door portion disposed within the opening to define a visible space or notch between the periphery of the door portion and the opening. The door portion is pivotally attached to an edge or side of the opening to hinge the door portion to the panel member. Thus, during air bag deployment, the door portion pivots away from the panel member, allowing the air bag to be deployed into a vehicle compartment. In many situations, a break-away skin material is disposed over the panel member to add an aesthetic feel and look to the panel. However, the visible notch between the door portion and the panel, in many cases, can be seen by an occupant of the vehicle.

One goal of an instrument manufacturer is to provide a seamless panel member having an air bag deployment system attached thereto while providing adequate air bag deployment during vehicle impact. As described above, many panel members have pivotally attached door portions which require a visible tear seam on its outer surface. Some panel members include break-away or tear seam portions molded to the panel member and door portion, and are comprised of different material than the panel member or door portion to provide a weakened area through which an air bag may be deployed during a vehicle impact. However, the different materials used often result in different shades of pigment, allowing visibility of the door portion.

Moreover, many panel members are configured with tear seams which, upon force placed thereon, may break and cause the door portion to pivotally move toward the air bag. In such event, the panel member is required to be replaced. This, obviously, is time consuming and high in cost.

Prior U.S. patents generally related to the present invention include the following: U.S. Pat. Nos. 6,341,796; 6,318,752; 6,089,642; 6,076,851; 5,927,747; 5,779,262; 5,698,283; 5,569,959; and 5,421,608.

SUMMARY OF THE INVENTION

It is an object of the present invention to provide an air bag deployment chute having at least one door portion and an opening through which the at least one door portion may pivot away from an air bag during deployment. The invention further includes a panel member to which the deployment chute is attached for deploying the air bag through the panel member during impact of the vehicle. The panel member has a groove formed on an inner surface of the panel member to define an seam which is not visible on an outer surface of the panel member.

In carrying out the above object and other objects of the present invention, an air bag deployment chute for deploying an air bag through a panel member of a vehicle is provided. The panel member has an outer show surface and an inner surface, wherein the deployment chute attaches to the inner surface of the panel member. The panel member includes a groove on the inner surface which forms a structurally weakened area of the panel member to enable selective air bag deployment through the structurally weakened area. The deployment chute comprises a stationary portion and at least one door portion. The stationary portion includes a base and a peripheral wall integrally connected to the base, wherein the base has first and second surfaces. The first surface attaches to the inner surface. The base has an inner periphery to define an opening of the base. The peripheral wall is integrally connected to the second surface of the base and extends therefrom. The peripheral wall defines a channel through which the air bag may be deployed. The stationary portion is configured to receive the air bag within the channel to guide the air bag through the stationary portion during deployment of the air bag. The at least one door portion is disposed on the inner surface of the panel member and in the opening adjacent the air bag. The at least one door portion is circumscribed by the stationary portion through which the air bag is deployed. The at least one door portion is hinged to the base to facilitate pivotal movement of the at least one door portion to allow deployment of the air bag through the opening of the stationary portion and through the structurally weakened area of the panel member during impact of the vehicle. The inner periphery is positioned against the structurally weakened area of the panel member so that outer portions of the groove are supported by the base to prevent inadvertent pivotal movement of the at least one door portion toward the air bag when force is applied on the outer surface of the panel member.

Another embodiment of the present invention provides an air bag deployment panel assembly for deploying the air bag through the panel member of the vehicle. The air bag deployment panel assembly comprises the panel member and the deployment chute, wherein the deployment chute includes the stationary portion and the at least one door portion.

Yet another embodiment of the present invention provides an air bag deployment chute for deploying the air bag through the panel member of the vehicle, wherein the groove of the panel member has a prescribed tear pattern which may be H-shaped, I-shaped or U-shaped.

Other objects, features, and advantages of the present invention will be apparent from the ensuing description in conjunction with the accompanying drawings.

DETAILED DESCRIPTION OF THE PREFERRED EMBODIMENTS

Figure 1:
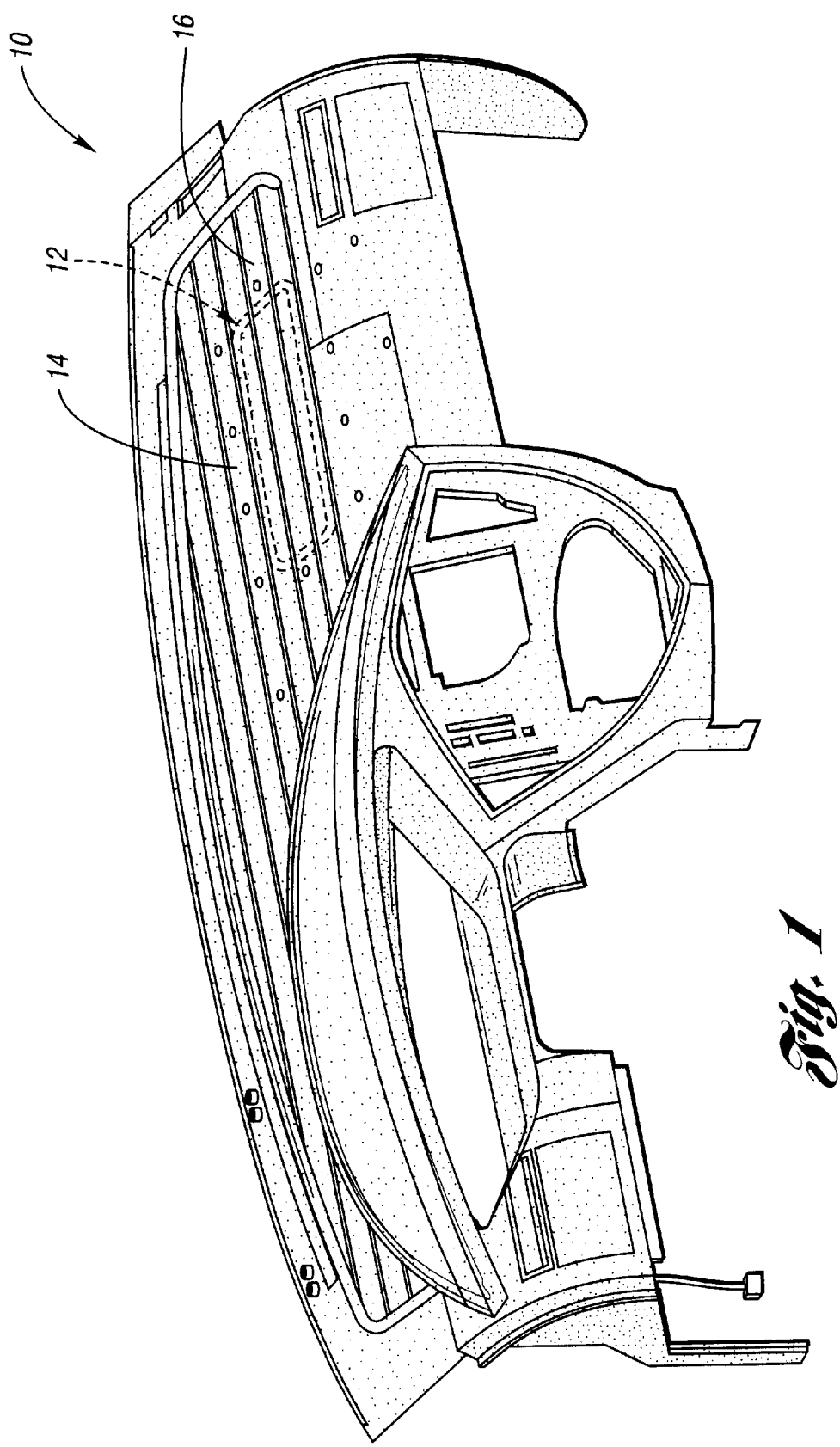
FIG. 1 is an environmental view of an air bag deployment panel assembly in accordance with the present invention.

FIG. 1 illustrates an air bag deployment panel assembly, generally indicated at 10, comprising an air bag deployment chute, generally indicated at 12 (in hidden line), and a panel member 14 in accordance with the present invention. The air bag deployment chute 12 cooperates with the panel member 14 for deploying an air bag through the panel member 14 into a compartment of a vehicle. As shown, the panel member 14 may comprise a vehicle's front panel member to which the deployment chute 12 is disposed for deploying an air bag to dissipate impact energy upon an outer show surface 16 of the panel member 14 during an impact of the vehicle. FIG. 1 depicts one embodiment of the present invention, wherein the deployment chute 12 is located adjacent a front passenger's seat. Of course, the deployment chute may be positioned against a front panel member and located adjacent a driver's seat of a vehicle, on a side panel member, or any other suitable panel member.

Figure 2:
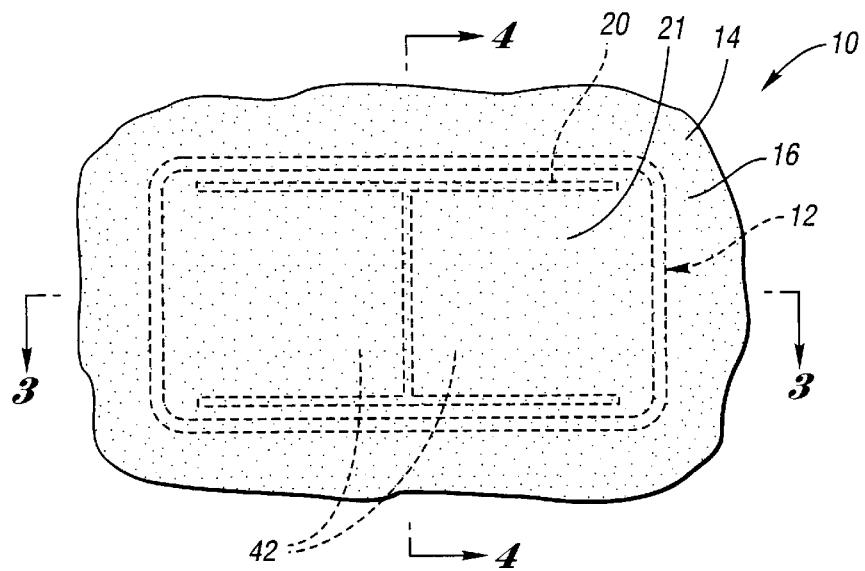
FIG. 2 is a top plan view, partially broken away, of an I-shaped tear seam.
Figure 3:
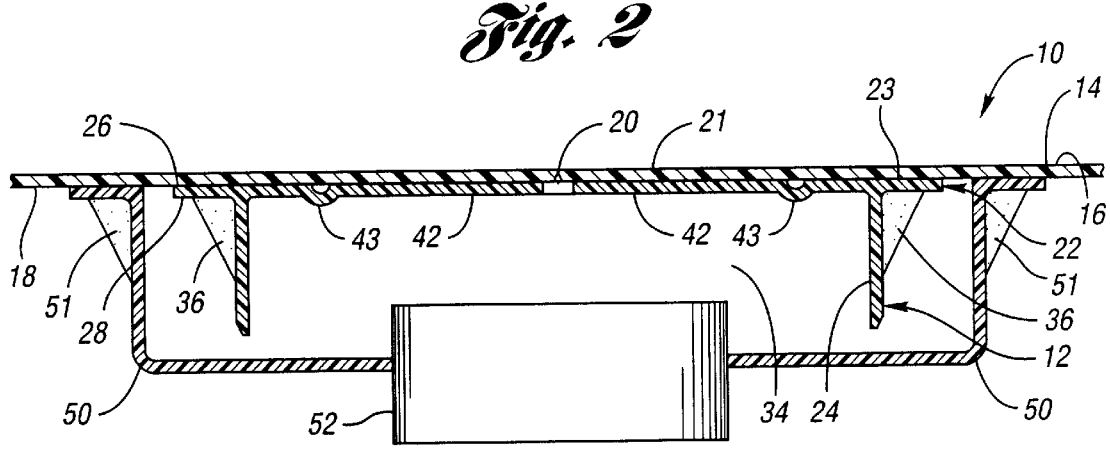
FIG. 3 is a cross-sectional view of the air bag deployment panel assembly taken along lines 3—3 of FIG. 2.
Figure 4:
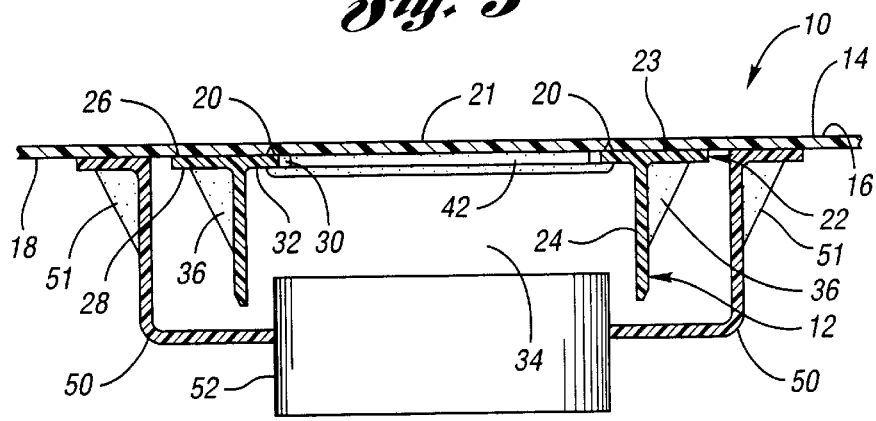
FIG. 4 is a cross-sectional view of the air bag deployment panel assembly taken along lines 4—4 of FIG. 2.

FIGS. 2–4 illustrate an embodiment of the invention wherein a tear seam pattern is I-shaped. As shown in FIG. 3, the panel member 14 has the outer show surface 16 and an inner surface 18. The deployment chute 12 is attached to the inner surface 18 of the panel member 14. As will be described in greater detail below, the deployment chute 12 is preferably heat-staked onto the inner surface 18. The panel member 14 includes an I-shaped groove 20 formed on the inner surface 18, as shown in FIG. 2. The groove 20 forms a structurally weakened area 21 of the panel member 14 to enable selective air bag deployment through the structurally weakened area 21.

As shown in FIGS. 3 and 4, the deployment chute 12 includes a stationary portion, generally indicated at 22, and a pair of door portions 42 hingedly connected to the rest of the stationary portion 22 at hinge portions 43. The stationary portion 22 includes a base 23 and a peripheral wall 24 which is integrally connected to the base 23. As shown, the base 23 includes first and second surfaces 26,28. While not shown, the base 23 preferably further includes slots formed therethrough for attaching the base 23 to the panel member 14. Preferably, a first surface 26 of the base 23 attaches onto the inner surface 18 of the panel member 14 by heat-staking the base 23 to the inner surface 18 through the slots.

The base 23 further has an inner periphery 32 to define an opening 30. The peripheral wall 24 is integrally connected to the second surface 28 of the base 23 and extends therefrom adjacent the inner periphery 32. The peripheral wall 24 defines a channel 34 through which an air bag (contained within an air bag canister described below) may be deployed during a vehicle impact to dissipate impact energy onto the outer show surface 16. The stationary portion 22 is configured to receive the air bag within the channel 34 to guide the air bag through the stationary portion 22 during deployment of the air bag. The channel 34 provides energy used in deployment of the air bag to be concentrated about the opening 30. This allows the door portions 42 to more efficiently and adequately pivot away from the deployment chute 12 and through the panel member 14.

The peripheral wall 24 includes a plurality of gussets 36 which are integrally connected to the second surface 28 of the base 23. The gussets 36 are configured to provide support to the peripheral wall 24 during deployment of the air bag through the opening 30.

As shown in FIGS. 3 and 4, the door portions 42 are positioned against the inner surface 18 of the panel member 14 and within the opening 30 adjacent the air bag. As shown, the door portions 42 are circumscribed by the stationary portion 22 through which the air bag is deployed upon vehicle impact. In this embodiment, the door portions 42 are integrally connected in part to the base 23 to hinge the door portions 42 to the stationary portion 22. This facilitates pivotal movement of door portions 42 to allow deployment of the air bag through the opening 30 of the stationary portion 22 and through the structurally weakened area 21 of the panel member 14 during impact of the vehicle. Of course, the door portions 42 may be connected to the base 23 in any other suitable way to hinge the door portions 42 to the stationary portion 22, allowing pivotal movement of the door portions 42 during deployment of the air bag. However, in this embodiment, the door portions 42 are integrally molded in part with the base 23.

As depicted in FIGS. 3 and 4, the I-shaped groove 20 is formed on the inner surface 18 of the panel member 14 without any substantial visibility on the outer surface 16. As shown in FIGS. 3 and 4, outer portions of the groove 20 are formed adjacent the first surface 26 of the base 23 and adjacent the stationary portion 22.

The inner periphery 32 is positioned against the structurally weakened area 21 of the panel member 14 so that outer portions of the I-shaped groove 20 are supported by the base 22 to prevent inadvertent pivotal movement of the door portion 42 toward the air bag when force is applied on the outer surface 16 of the panel member 14. Thus, outer portions of the I-shaped groove 20 are formed outside the inner periphery 32 so that the opening 30 of the base 23 is formed within the structurally weakened area 21 when the chute 12 is attached to the panel member 14. This prevents pivotal movement of the door portions 42 toward the air bag. In a situation wherein force or energy is placed on the outer surface 16 at the structurally weakened area 21, the outer surface 16 will be prevented from breaking through the door portions 42 because of the manner in which the groove 20 is disposed on the deployment chute 12 (described above). Thus, force placed onto the structurally weakened area 21 of the outer surface 16 will not cause the outer surface 16 to break through the door portions 42.

FIGS. 3 and 4 also illustrate an air bag canister support structure in the form of a pair of support brackets 50 attached to the inner surface 18 of the panel member 14, such as by heat-staking. A plurality of gussets 51 are integrally connected to the second surface 28 of the base 23 and provide support to the brackets 50. The support brackets 50 are configured to align a supported air bag canister 52 (with the air bag therein) with the channel 34. The support brackets 50 are connected to the canister 52 such as by a snap-on connection or other connector.

Figure 5:
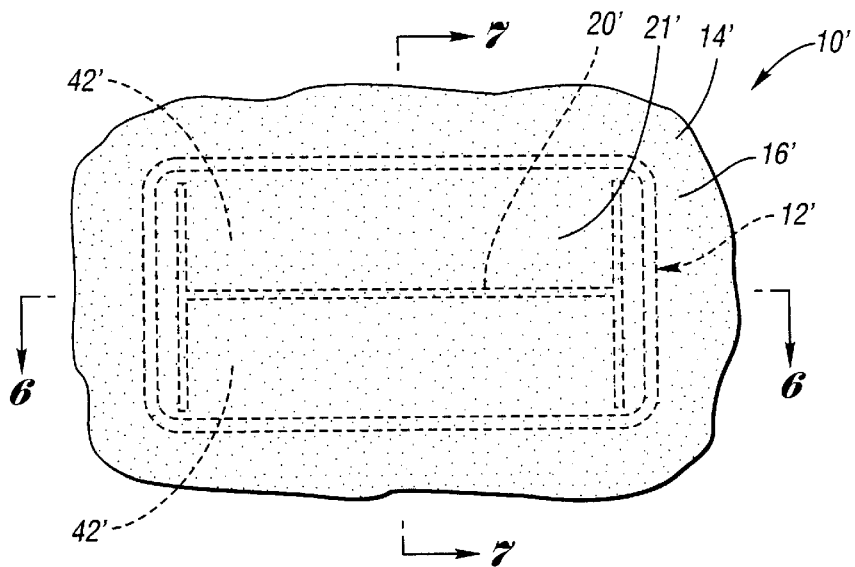
FIG. 5 is a top plan view, partially broken away, of an H-shaped tear seam.
Figure 6:
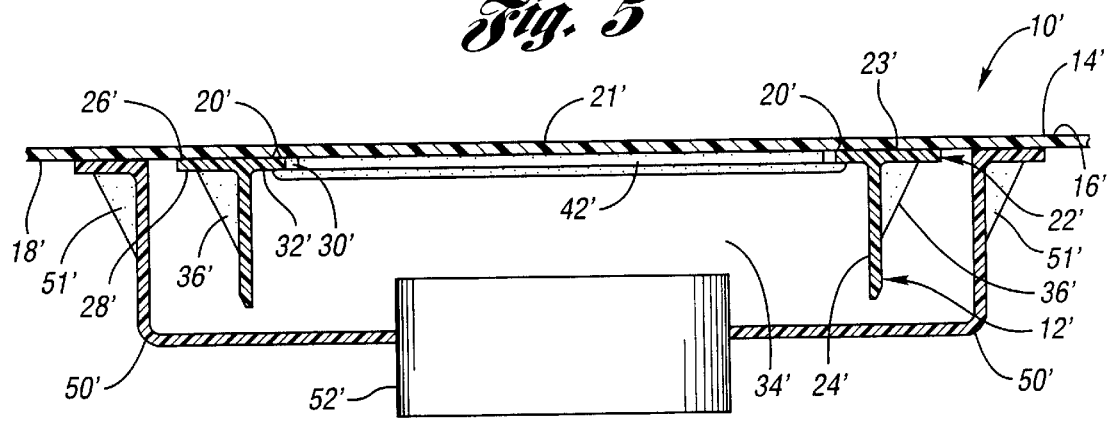
FIG. 6 is a cross-sectional view of the assembly taken along lines 6—6 of FIG. 5.
Figure 7:
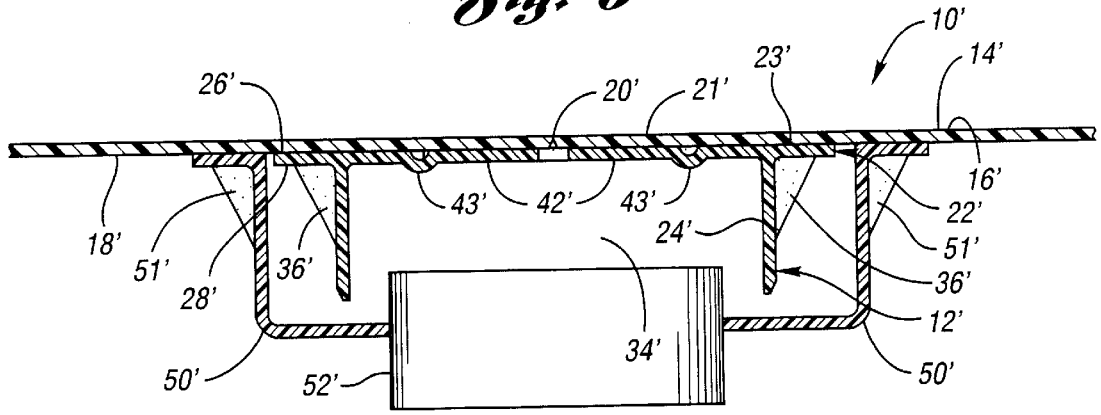
FIG. 7 is a cross-sectional view of the assembly taken along lines 7—7 of FIG. 5.

FIGS. 5–7 illustrate another embodiment of the invention wherein the tear seam pattern is H-shaped. Parts of the invention which are the same or similar in form and/or function to parts of FIGS. 2–4 have the same reference number, but a single prime designation.

Figure 8:
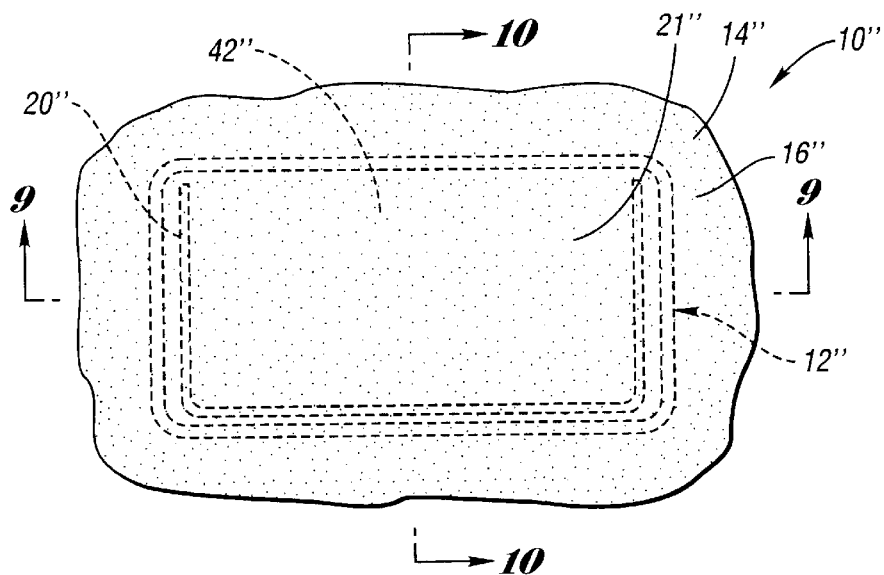
FIG. 8 is a top plan view, partially broken away, of a U-shaped tear seam.
Figure 9:
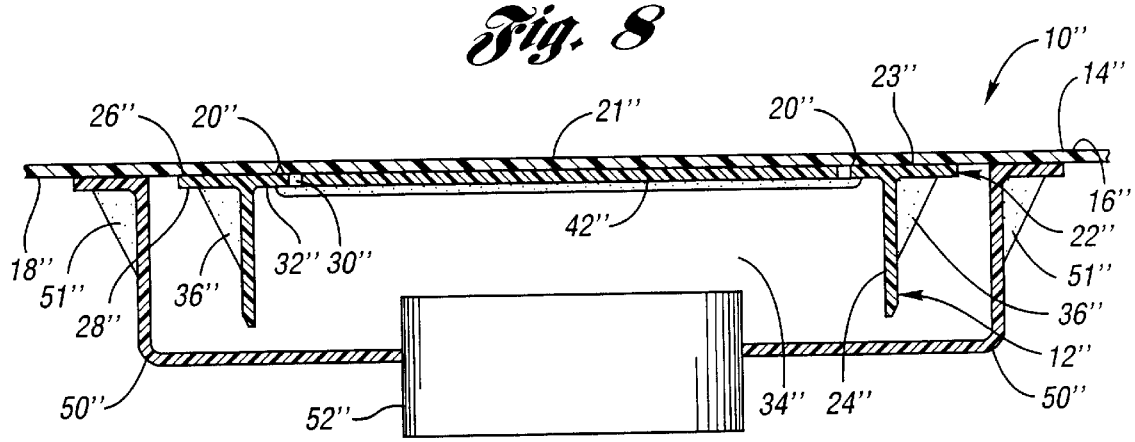
FIG. 9 is a cross-sectional view of the assembly taken along lines 9—9 of FIG. 8.
Figure 10:
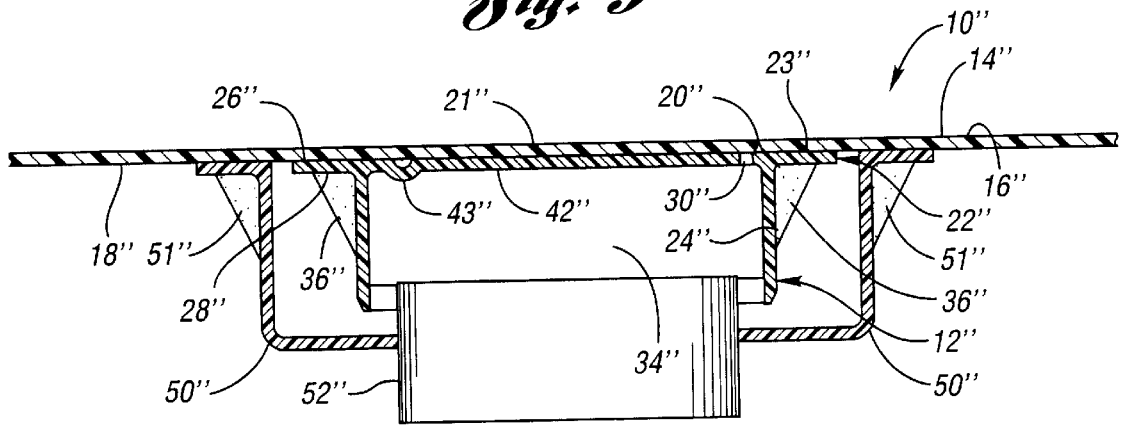
FIG. 10 is a cross-sectional view of the assembly taken along lines 10—10 of FIG. 8.

FIGS. 8–10 illustrate yet another embodiment of the invention wherein the tear seam pattern is U-shaped. Parts of the invention which are the same or similar in form and/or function to parts of FIGS. 2–4 have the same reference number, but a double prime designation.

The deployment chutes 12, 12' and 12" are formed of a material more rigid than the material of their corresponding panel members 14, 14' and 14". Preferably, the deployment chutes 12, 12' and 12" comprise rigid material such as polycarbonate resin containing acrylonitrile, butadiene, and styrene (PC-ABS) material, thermoplastic elastomer etherether (TEEE), polypropylene, or a thermoplastic polyolefinic (TPO) material. The material comprising the panel members 14, 14' and 14" is less rigid than the material of the stationary portions 22, 22' and 22". Preferably, but not necessarily, the panel members 14, 14' and 14" may comprise of the product having the trade name Santoprene™ supplied by Monsanto Co. Preferably, the materials used for the panel members 14, 14' and 14" and the deployment chutes 12, 12' and 12" are compatible to allow the parts to be bonded together.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An air bag deployment chute for deploying an air bag through a panel member of a vehicle, the panel member having an outer show surface and an inner surface, the deployment chute attached to the inner surface of the panel member, the panel member including a groove formed on the inner surface which forms a structurally weakened area of the panel member to enable selective air bag deployment through the structurally weakened area, the deployment chute comprising:

a stationary portion including a base and a peripheral wall integrally connected to the base, the base having first and second surfaces, the first surface attached to the inner surface, the base having an inner periphery to define an opening of the base, the peripheral wall being integrally connected to the second surface of the base and extending therefrom, the peripheral wall defining a channel through which the air bag may deploy, the stationary portion being configured to receive the air bag within the channel to guide the air bag through the stationary portion during deployment of the air bag; and at least one door portion disposed on the inner surface of the panel member and in the opening adjacent the air bag, the at least one door portion being circumscribed by the stationary portion through which the air bag is deployed, the at least one door portion being hinged to the base to facilitate pivotal movement of the at least one door portion away from the air bag to allow deployment of the air bag through the opening of the stationary portion and through the structurally weakened area of the panel member during impact of the vehicle, the inner periphery being positioned against the structurally weakened area of the panel member so that outer portions of the groove are supported by the base to prevent inadvertent pivotal movement of the at least one door portion toward the air bag when force is applied on the outer surface of the panel member.

2. The deployment chute of claim 1 further comprising an air bag canister support structure attached to the inner surface of the panel member, the support structure being configured to align a supported air bag canister with the channel.

3. The deployment chute of claim 1 wherein the at least one door portion is integrally molded with the base.

4. The deployment chute of claim 1 wherein the peripheral wall includes a plurality of gussets integrally connected to the second surface of the base, the plurality of gussets configured to provide support to the peripheral wall during deployment of the air bag through the opening.

5. The deployment chute of claim 1 wherein the deployment chute comprises rigid material.

6. The deployment chute of claim 5 wherein the rigid material includes a high density thermoplastic.

7. An air bag deployment panel assembly for deploying an air bag through a panel member of a vehicle, the air bag deployment panel assembly comprising:

a panel member having an outer show surface and an inner surface, the panel member including a groove on the inner surface which forms a structurally weakened area of the panel member to enable selective air bag deployment through the structurally weakened area; and a deployment chute positioned against the inner surface of the panel member, the deployment chute including:

a stationary portion including a base and a peripheral wall integrally connected to the base, the base having first and second surfaces, the first surface attached to the inner surface, the base having an inner periphery to define an opening of the base, the peripheral wall being integrally connected to the second surface of the base and extending therefrom adjacent the inner periphery, the peripheral wall defining a channel through which the air bag may deploy, the stationary portion being configured to receive the air bag within the channel to guide the air bag through the stationary portion during deployment of the air bag; and at least one door portion disposed on the inner surface of the panel member and in the opening adjacent the air bag, the at least one door portion being circumscribed by the stationary portion through which the air bag is deployed, the at least one door portion being hinged to the base to facilitate pivotal movement of the at least one door portion to allow deployment of the air bag through the opening of the stationary portion and through the structurally weakened area of the panel member during impact of the vehicle, the inner periphery being positioned against the structurally weakened area of the panel member so that outer portions of the groove are supported by the base to prevent inadvertent pivotal movement of the at least one door portion toward the air bag when force is applied on the outer surface of the panel member.

8. The deployment assembly of claim 7 wherein the at least one door portion is integrally molded with the base.

9. The deployment assembly of claim 7 wherein the peripheral wall includes a plurality of gussets integrally connected to the second surface of the base, the plurality of gussets configured to provide support to the peripheral wall during deployment of the air bag through the opening.

10. The deployment assembly of claim 7 further comprising an air bag canister support structure attached to the inner surface of the panel member, the support structure being configured to align a supported air bag canister with the channel.

11. The deployment assembly of claim 7 wherein the deployment chute comprises rigid material.

12. The deployment assembly of claim 11 wherein the rigid material includes a high density thermoplastic.

13. An air bag deployment chute for deploying an air bag through a panel member of a vehicle, the panel member having an outer show surface and an inner surface, the deployment chute positioned against the inner surface of the panel member, the panel member including a groove formed on the inner surface which forms a structurally weakened area of the panel member to enable selective air bag deployment through the structurally weakened area, the groove defining a prescribed tear pattern, the deployment chute comprising:

a stationary portion including a base and a peripheral wall integrally connected to the base, the base having first and second surfaces, the first surface attached to the inner surface, the base having an inner periphery to define an opening of the base, the peripheral wall being integrally connected to the second surface of the base and extending therefrom, the peripheral wall defining a channel through which the air bag may deploy, the stationary portion being configured to receive the air bag within the channel to guide the air bag through the stationary portion during deployment of the air bag; and at least one door portion disposed on the inner surface of the panel member and in the opening adjacent the air bag, the at least one door portion being circumscribed by the stationary portion through which the air bag is deployed, the at least one door portion being hinged to the base to facilitate pivotal movement of the at least one door portion away from the air bag to allow deployment of the air bag through the opening of the stationary portion and through the structurally weakened area of the panel member during impact of the vehicle, the inner periphery being positioned against the structurally weakened area of the panel member so that outer portions of the groove are supported by the base to prevent inadvertent pivotal movement of the at least one door portion toward the air bag when force is applied on the outer surface of the panel member.

14. The deployment chute of claim 13 wherein the at least one door portion is integrally molded with the base.

15. The deployment chute of claim 13 wherein the peripheral wall includes a plurality of gussets integrally connected to the second surface of the base, the plurality of gussets configured to provide support to the peripheral wall during deployment of the air bag through the opening.

16. The deployment chute of claim 13 further comprising an air bag canister support structure attached to the inner surface of the panel member, the support structure being configured to align a supported air bag canister with the channel.

17. The deployment chute of claim 13 wherein the deployment chute comprises rigid material.

18. The deployment chute of claim 17 wherein the rigid material includes a high density thermoplastic.

19. The deployment chute of claim 13 wherein the prescribed tear pattern is a generally H-shaped, I-shaped or U-shaped pattern.

20. The deployment chute of claim 1 wherein the structurally weakened area is a generally H-shaped, I-shaped or U-shaped pattern.

21. The deployment assembly of claim 7 wherein the structurally weakened area is a generally H-shaped, I-shaped or U-shaped pattern.

* * * * *